United States Patent [19]
Thompson

[11] 3,991,038
[45] Nov. 9, 1976

[54] POLYAMIDE POLYMER OF ALKYLADAMANTANE DIAMINE AND CYCLIC HYDROCARBON DIACID

[75] Inventor: Robert M. Thompson, Wilmington, Del.

[73] Assignee: Sun Ventures, Inc., St. Davids, Pa.

[22] Filed: June 3, 1975

[21] Appl. No.: 583,815

Related U.S. Application Data

[60] Continuation-in-part of Ser. No. 440,887, Feb. 8, 1974, abandoned, which is a division of Ser. No. 191,833, Oct. 22, 1971, Pat. No. 3,832,332.

[52] U.S. Cl. .......................... 260/78 R; 260/33.4 R
[51] Int. Cl.² ........................................ C08G 69/26
[58] Field of Search ................................. 260/78 R

[56] References Cited
UNITED STATES PATENTS

| | | | |
|---|---|---|---|
| 3,053,907 | 9/1962 | Smith et al. | 260/78 R |
| 3,301,827 | 1/1967 | Martin | 260/78 R |
| 3,464,957 | 9/1969 | Driscoll | 260/78 R |

OTHER PUBLICATIONS
Kirk–Othmer, Encyclopedia of Chemical Technology, 2nd Edition, 1967, pp. 6, 7, 20, 22, 27.

*Primary Examiner*—Harold D. Anderson
*Attorney, Agent, or Firm*—J. Edward Hess; Donald R. Johnson; Anthony Potts, Jr.

[57] ABSTRACT

A novel solid polyamide polymer is prepared by the condensation of an alkyladamantane diamine of the structure:

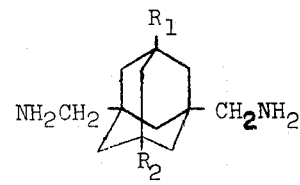

wherein each of $R_1$ and $R_2$ is an alkyl radical having 1–10 carbon atoms and a cyclic hydrocarbon diacid having the following structure, HCOORCOOH wherein R is an arylene or alkyl substituted arylene, or an alicyclic hydrocarbon or an alkyl substituted alicyclic hydrocarbon. The solid polymer is useful in forming films, transparent molded articles, and other similar thermoplastic products.

4 Claims, No Drawings

POLYAMIDE POLYMER OF ALKYLADAMANTANE DIAMINE AND CYCLIC HYDROCARBON DIACID

CROSS REFERENCE TO RELATED APPLICATIONS

This application is a continuation-in-part of application Ser. No. 440,887, filed Feb. 8, 1974, now abandoned, which is a divisional of Ser. No. 191,833, filed Oct. 22, 1971 (now U.S. Pat. No. 3,832,332) which is related to those described and claimed in applicant's applications Ser. Nos. 191,706 (abandoned Nov. 20, 1972), 191,826 (now U.S. Pat. No. 3,748,359), 191,827 (now U.S. Pat. No. 3,770,794), and 191,700 (abandoned May 22, 1973), all filed the same date. The first of the last four applications relates to the preparation of an alkyladamantane diamine from an alkyladamantane diacid; the second to the preparation of an alkyladamantane dinitrile from an alkyladamantane diacid; the third to a novel polyimide polymer prepared from alkyladamantane diamine, and the fourth to a method for preparing a water white polyimide polymer from an alkyladamantane diamine.

BACKGROUND OF THE INVENTION

Preparation of an alkyladamantane diamine of the structure:

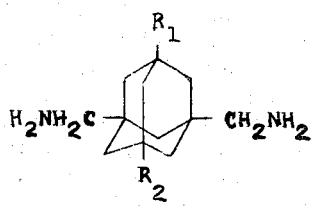

wherein each of $R_1$ and $R_2$ is an alkyl radical having 1–10 carbon atoms from its alkyladamantane diacid is shown in the aforementioned application Ser. No. 191,826, now U.S. Pat. No. 3,748,359.

Preparation of an alkyladamantane diacid, the precursor of an alkyladamantane diamine, is described in U.S. Pat. No. 3,356,719, issued Dec. 5, 1967, A. Schneider, et al.

Preparation of a cyclic hydrocarbon diacid having the following structure, HOOCRCOOH where R is an arylene or alkyl substituted arylene is shown in *ENCYCLOPEDIA OF CHEMICAL TECHNOLOGY*, Kirk-Othmer, 2nd Edition, Vol. 1, starting page 240, Acids, Dicarboxylic. Preparation of such acids where R is an alicyclic hydrocarbon or an alkyl substituted alicyclic hydrocarbon is shown in U.S. Pat. No. 3,162,679.

Generally a condensation polymer is one derived from two monomeric starting materials and is formed by the elimination of water or the equivalent. Thus, as used herein, the term condensation polymer refers to the diamine (A) and the diacid (B) condensing to form the novel polyamide having the repeating unit —AB—.

SUMMARY OF THE INVENTION

The present invention relates to a novel polyamide polymer. More particularly, the invention relates to a solid polymer produced from an alkyladamantane diamine and cyclic hydrocarbon diacid, such as phthalic acid, via condensation.

DESCRIPTION OF THE INVENTION

The polyamide polymer of the present invention can be described as polymer prepared in part from an alkyladamantane diamine of the following structure:

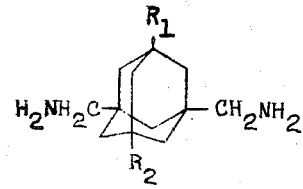

wherein $R_1$ and $R_2$ each is an alkyl radical having 1–10 carbon atoms. Preferable diamine are those where $R_1$ and $R_2$ each is a methyl and/or ethyl radical.

The other reactant used to prepare the polymer of the present invention is a cyclic hydrocarbon diacid having the following structure, HOOCRCOOH where R can be an arylene or alkyl substituted arylene. Arylene is a bivalent radical derived from an aromatic hydrocarbon by removal of a hydrogen atom from each of two carbon atoms of the nucleus. Aromatic hydrocarbon denotes a hydrocarbon in which at least one benzene ring is present. Examples of arylenes are phenylene, naphthylene and diphenylene. Examples of alkyl substituted arylenes are ethylnaphthylene, butylnaphthylene, decanaphthylene, ethylphenylene and decaphenylene. The alkyl of the substituted arylene can contain one to ten carbon atoms. The substituted arylene can also contain more than one alkyl. Examples of the diacid are phthalic, isophthalic, terephthalic, 2,6-naphthalenedicarboxylic, and 1,5-naphthalenedicarboxylic. Examples of the alkyl substituted diacids are 3-isopropylisophthalic, 2,3-dimethylterephthalic, 1,5-dimethyl-2,6-naphthalenedicarboxylic and 2-propyl-1,5-naphthalenedicarboxylic.

The aforementioned R can be also an alicyclic hydrocarbon or an alkyl substituted alicyclic hydrocarbon. Alicyclic refers to compounds containing a ring of carbon atoms but not belonging to the aromatic series. Examples of such are cyclopentylene, cyclohexylene, 1-ethyl cyclohexylene, 1,4-dimethyl cyclohexylene, bicyclo(4.4.0)decylene, bicyclo-(5.3.0)decylene and 1-methyl-cicyclo(4.4.0)decylene. The alkyl of a substituted alicyclic hydrocarbon can contain one to ten carbon atoms.

Thus the two reactants form a solid polyamide polymer consisting essentially of repeating units of the following structural unit:

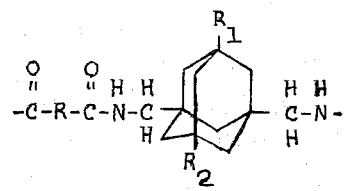

The polymers of the present invention preferably have inherent viscosities in the range of about 0.05 to 5.0. The inherent viscosity ($\eta$inh.) is indicative of the degree of polymerization and is used herein as a measure thereof. Inherent viscosity is represented by the equation:

$$\eta \text{ inherent} = \ln \frac{\eta \text{ relative}}{C}$$

where $\eta$ relative $= t/t_o$ $t_o =$ flow time through a viscometer of a liquid reference $t =$ flow time through the same viscometer of a dilute solution of polymer in the reference liquid $C =$ concentration of polymer in solution expressed in grams/deciliter Inherent viscosities ($\eta$inh.) unless otherwise specified are determined in the instant specification and claims by a 0.5% solution of polymer in m-cresol and are measured at 37.8° C.

The molecular weight of the polymer depends on the number of repeating units; i.e., the number of diamine-carboxylic acid units that occur repeatedly in the resulting molecule. The molecular weight of the polymer is preferably as low as 2,000 or as high as 75,000; however, a particularly suitable polymer is one having a molecular weight in the range of about 10,000 – 60,000; more suitably 20,000 – 50,000. These molecular weights are determined by measurement of inherent viscosities.

Three methods can be employed to prepare the polyamide. These are interfacial condensation, melt condensation and solution condensation. These methods are described in detail in U.S. Pat. No. 3,464,957, Sept. 2, 1969, G. L. Driscoll. While all three methods produce satisfactory polymers, the melt condensation is preferred. The latter is also known as "nylon salt" condensation.

The "melt" method is described in detail in the example hereinafter. Certain ratios of reactants and certain reaction conditions have been specified in the example. It will be understood, of course, that the reaction variables are more or less interdependent and that when one is arbitrarily fixed the limits within which the others may be varied are somewhat restricted. The more desirable ranges and relationships can be ascertained from the example presented hereinafter. For any particular application of the invention, most desirable conditions can be readily determined by trial by one skilled in the art, such a determination being facilitated by the trends of these variables presented in the example.

Examples of articles that can be prepared from the solid polyamide polymer defined herein include films, transparent molded articles and others which are described in *MODERN PLASTICS ENCYCLOPEDIA*, 1970/1971. These articles comprise, in addition to the polyamide itself, the usual additives such as antioxidants, antistatic agents, colorants, plasticizers, flame retardants, bulk fillers, stabilizers, and ultraviolet absorbers. Methods used to process the polyamide polymer, with or without additives, into a desired form include extrusion, injection molding, casting, and other described in the aforementioned encyclopedia.

EXAMPLE

Seven grams of isophthalic acid and 9.1 grams of 1,3-di(aminomethyl-5,7-dimethyladamantane are dissolved in 120 milliliters of anhydrous methanol. After standing for 3 hours, 60 milliliters of isopropyl alcohol are added to the methanol mixture to precipitate the salt. The precipitate is filtered from the alcohol mixture and washed with cold isopropyl alcohol and afterwards dried in a vacuum. Twelve grams are obtained. A water solution of the salt has a pH of 6.8.

Some of the aforementioned salt is placed in a heavy walled glass polymerization tube under high vacuum. Care is taken to insure complete absence of oxygen. The tube is sealed. It is then placed in a metal bath maintained at 220° C. and is kept in the bath for 1½ hours. Afterwards the tube is cooled to room temperature and the prepolymer is removed. The prepolymer is crushed and placed in a test tube, which is hooked up to an on-off vacuum system, along with a drop of water. The water converts to steam during heating and helps purge out any air in the tube. Also, the tube is purged with nitrogen to remove any oxygen. The tube is placed in refluxing dimethyl phthalate maintained at a temperature of 283° C. After 3 hours elapse, a vacuum is applied to the tube for one hour which facilitates the removal of the final traces of reaction water. The vacuum is shut off, the tube is filled with nitrogen, and the bath is removed. After the temperature of the tube reaches ambient temperature, the polymer is removed.

The polymer is a clear, transparent material with a softening point of 240° C. Its inherent viscosity in m-cresol is 0.82.

The use of other cyclic hydrocarbon diacids and mixtures of diacids such as phthalic acid, isophthalic acid, terephthalic acid, 2,6-dimethyl terephthalic acid, 2-propyl-1,5-naphthalenedicarboxylic acid, 1,4-cyclohexanedicarboxylic acid, and 2,6-decalindicarboxylic acid and the like will yield analogous copolymers. Also, use of other adamantane diamines such as 1,3-di(aminomethyl)-5-methyl, 7-ethyladamantane, etc., also will yield analogous polymers.

The invention claimed is:

1. A solid polyamide polymer consisting essentially of repeating units of the following structural unit:

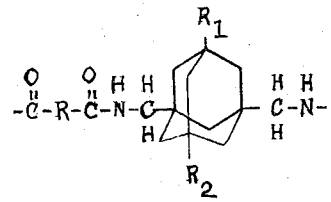

wherein $R_1$ and $R_2$ each is an alkyl having 1–10 carbon atoms and R is an arylene or alkyl substituted arylene wherein the alkyl contains 1–10 carbon atoms or an alicyclic hydrocarbon or an alkyl substituted alicyclic hydrocarbon wherein the alkyl contains 1–10 carbon atoms.

2. A polymer according to claim 1 wherein the inherent viscosity is 0.05 to 5.0 as determined by a 0.5% solution of polymer in m-cresol and measured at 37.8° C.

3. A polymer according to claim 2 wherein R is phenylene.

4. A polymer according to claim 2 wherein R is naphthylene.

* * * * *